(12) United States Patent
Huang et al.

(10) Patent No.: US 9,641,699 B2
(45) Date of Patent: May 2, 2017

(54) CALIBRATION OF SCANNING DEVICES

(71) Applicant: Hewlett-Packard Development Company, L.P., Houston, TX (US)

(72) Inventors: Xiaoxi Huang, Singapore (SG); Lim Cheng Woon, Singapore (SG); Chin Hung Andy Koh, Singapore (SG)

(73) Assignee: Hewlett-Packard Development Company, L. P., Houston, TX (US)

( * ) Notice: Subject to any disclaimer, the term of this patent is extended or adjusted under 35 U.S.C. 154(b) by 498 days.

(21) Appl. No.: 13/752,463

(22) Filed: Jan. 29, 2013

(65) Prior Publication Data
US 2014/0211268 A1   Jul. 31, 2014

(51) Int. Cl.
*H04N 1/00* (2006.01)
(52) U.S. Cl.
CPC ..... *H04N 1/00018* (2013.01); *H04N 1/00034* (2013.01); *H04N 1/00087* (2013.01)
(58) Field of Classification Search
None
See application file for complete search history.

(56) References Cited

U.S. PATENT DOCUMENTS

| | | | | |
|---|---|---|---|---|
| 6,323,933 B1* | 11/2001 | Anzai | | 355/23 |
| 6,535,649 B1* | 3/2003 | Chiu | | 382/274 |
| 6,897,989 B2* | 5/2005 | Okamura | | 358/529 |
| 7,286,261 B2* | 10/2007 | Gudaitis et al. | | 358/1.9 |
| 7,388,690 B2 | 6/2008 | Thakur | | |
| 7,679,796 B2* | 3/2010 | Shoda | | 358/518 |
| 2005/0029352 A1 | 2/2005 | Spears | | |
| 2006/0001921 A1* | 1/2006 | Bailey et al. | | 358/504 |
| 2006/0023267 A1* | 2/2006 | Ikeno et al. | | 358/474 |
| 2007/0103734 A1* | 5/2007 | Angal et al. | | 358/406 |
| 2009/0063079 A1* | 3/2009 | Klassen | | 702/86 |
| 2009/0091808 A1* | 4/2009 | Bailey et al. | | 358/504 |
| 2009/0287442 A1* | 11/2009 | Klassen | | 702/85 |

OTHER PUBLICATIONS

Bosua, P., Scanbox—Turn your iphone Into a Portable Scanner, (web Page), May 8, 2012.

* cited by examiner

*Primary Examiner* — Kimberly A Williams
(74) *Attorney, Agent, or Firm* — HP Inc. Patent Department

(57) ABSTRACT

Systems and methods for calibrating scanning devices are described. The method comprises dividing a dark scan image of a calibration strip into one or more regions. The dark scan image is further analyzed to obtain at least one data point from each of the one or more regions. Further, calibration values for each of the one or more regions are computed based on the at least one data point for calibrating the scanning device. The calibration values include mean and standard deviation of the data points for each of the one or more regions.

15 Claims, 5 Drawing Sheets

CALIBRATION OF SCANNING DEVICES

BACKGROUND

Scanning devices are peripherals commonly used in home and office environments for obtaining digital copies of printed documents. The printed document may include any of a variety of media types on which some content, for example, text, graphics, and a picture may be provided. A scanning process typically includes illuminating the document and receiving, by the sensors, the illuminated reflection to obtain copies of the document. The sensors obtain image data corresponding to different areas of the document based on the light reflected from those areas. Further, a scanner lid is usually provided to cover the document for preventing external light from falling on the document and the sensors during the scanning process.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
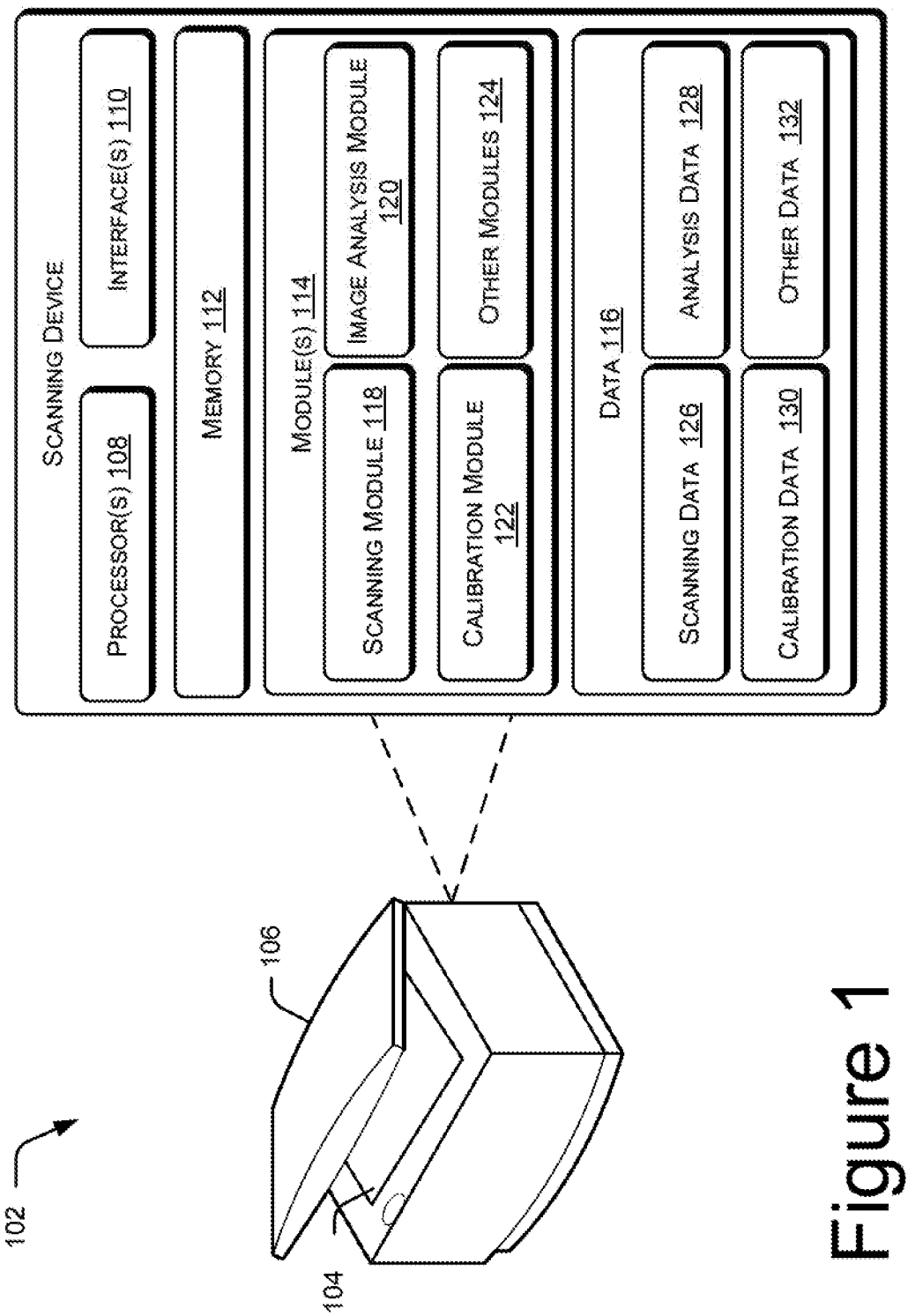
FIG. 1 illustrates a scanning device, according to an embodiment of the present subject matter.

The present subject matter relates to systems and methods for calibration of scanning devices. The scanning devices may be described as devices used for obtaining digital copies of printed documents, such as paper and a card stock having printed thereon some content, such as text, graphics, and a picture. The digital copy of the printed document may be defined as an electronic image of the printed document. The scanning devices typically include light sources for directing light on the document such that differing intensities of light reflected from the surface of the document may be used to generate an electronic image of the document. Intensity of the reflected light typically helps a sensor of the scanning device to determine shade and density of the corresponding points on the surface of the document.

Upon being subjected to the light, each point or pixel on the surface of the document reflects the light with a particular intensity depending on shade and density of the point such that points having same shade and density are expected to reflect light with equal intensity upon being subjected to same amount of light. In reality, the reflection from point to point having the similar characteristics may vary. Further, any deviation in the light provided by the source lights may cause the similar points to reflect differing intensities of light, thus affecting the quality of the electronic image of the document. Thus, the light sources are tuned to direct uniform amount of light across the complete document to provide consistent image quality.

One of the currently used techniques implemented to provide substantially consistent image quality involves calibrating the scanning devices. As is generally known, calibration is a process of comparison between two measurements, one corresponding to a standard or reference measurement and the other corresponding to that of the actual operating parameters of the device being calibrated. Currently, calibration is performed to fine tune the scanning device by adjusting the sensors and light sources, also referred to as illuminants, for correcting offsets of the scanning device. For instance, photo response non-uniformity (PRNU) calibration is performed to correct offsets in sensitivity of sensors provided in the scanning device to measure the intensity of the light reflected from the surface of the document. Similarly, other calibration methods are used for improving distinction between the document and the surface of a document holder of the scanning device on which the document is placed.

The currently used calibration methods do not take into account interference caused due to the external light during the calibration process. For instance, while calibrating the scanning device in outdoor environments having bright and ambient external light, the ambient light may cause interference in the calibration process, thus causing erroneous calibration of the scanning device. Such erroneous calibration may affect the quality of the document resulting in undesirable marks on the digital copy of the document, for example, in the form of vertical streaks on the areas exposed to the external light.

The scanning device, in accordance with an embodiment of the present subject matter implements a method for calibrating the scanning device taking into account the ambient light. In an implementation, the scanning device detects and discards erroneous calibrations caused by the ambient light and instead use results obtained from a previous calibration or a reference calibration for correcting offsets of the scanning device. The previous calibration may be defined as the last calibration of the scanning device done before current calibration. The reference calibration may be defined as the calibration performed at a factory site where the scanning device is manufactured.

The scanning device may be of any currently used scanner type, for example, a sheet feed scanner, a flat bed scanner, and drum scanners. Further, in one implementation, the scanning device may be any standalone scanner. In another implementation, the scanning device may be any imaging apparatus used for scanning documents, for example, an ink jet printer and/or copier, an electrophotographic printer and/or copier, and an all-in-one unit.

According to an embodiment of the present subject matter, the method includes performing calibration of the scanning device, comparing current calibration values with reference calibration values and determining, based on the comparison, whether to use the current calibration values for the offset correction. In one implementation, the reference calibration value is obtained by performing an initial calibration at a factory site where the scanning device is manufactured.

For the purpose, initially a dark scan is performed using the scanning device to obtain a dark scan image of a calibration strip. The dark scan involves performing a scan with all the illuminants turned OFF, i.e., without any light. The dark scan image is subsequently divided into one or more regions and analyzed for obtaining data points from each of the regions. In one implementation, the number of regions may be determined based upon size of a document holder of the scanning device such that each region is of a size large enough to provide appropriate number of data points for meaningful statistical analysis and, at the same time, the region is short enough to minimize inherent variations in signals caused due to design of the scanning device.

Each of the regions is subsequently analyzed to obtain the data points. A data point corresponding to an area of the region may be defined as a value given to a signal generated by a sensor upon sensing light reflected from that area. When a scan is performed without any light, the sensor may still produce a signal due to current leakage in the sensor (typically called dark current). Dark scans are used to measure this dark current and correct for it. In one implementation, each signal may be provided a value depending upon the intensity of the light sensed by the sensor. Subsequently, the data points may be used to ascertain reference mean and standard deviation for each of the regions. The reference mean and standard deviation for each of the regions may be saved as the reference calibration values in the scanning device for using them as reference values for determining correctness of any subsequent calibration done on the scanning device.

For instance, during a regular use of the scanning device, the scanning device may be calibrated, for example, upon getting rebooted. The scanning device, in such a case, may perform the calibration process again by performing the dark scan to obtain a current dark scan image of the calibration strip. The current dark scan image may be divided in the number of regions equal to the number of regions obtained during the initial calibration. The regions may be subsequently analyzed to obtain data points for determining mean and standard value, i.e., current calibration values. The current calibration values, thus obtained, may be compared with the reference calibration values to determine whether the current calibration values are erroneous or not. In case the current calibration values differ from the reference calibration value by a threshold value, then the current calibration value may be discarded and a corrective action may be taken.

In one embodiment, the corrective action may include using either previous calibration values that were accepted by the scanning device or the reference calibration values to correct offset in the scanning. In another embodiment, an alert message may be provided to a user interface of the scanning device asking a user of the scanning device to take corrective actions. For instance, an alert message may be provided to ask the user to move the scanning device to a shaded place so as to avoid interference caused due to the external light. Alternatively, the alert message may be provided asking the user to switch off light sources which are proximate to the region. Additionally, the alert message may be provided to direct the user to properly close lid of the scanning device and perform a re-calibration for the scanning device.

The present subject matter thus facilitates in eliminating erroneous calibrations due to interference of external lights, thereby ensuring consistent image quality of the digital copy of a document, irrespective of the external light conditions. Further, in environments, such as office environments, where the intensity of the external light may not vary substantially from time to time, during the day or over a period, the present subject matter may be used to detect whether the lid of the scanner is properly closed or not during a scanning process, thus preventing extra costs for installing sensors to detect the same.

The above systems and methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the systems and methods for calibrating scanning device are implemented is explained in details with respect to FIGS. 1 to 5. While aspects of described systems and methods for calibrating scanning device can be implemented in any number of different computing systems, environments, and/or configurations, the embodiments are described in the context of the following system(s).

FIG. 1 illustrates a scanning device 102, according to an embodiment of the present subject matter. The scanning device 102 may be described as a device used to scan any document for obtaining digital copies of the document.

Examples of the scanning device 102 may include, but are not limited to, scanners, an imaging apparatus used to scan documents, an ink jet printer and/or copier, an electrophotographic printer and/or copier, an all-in-one unit, and the like. Further, the scanning device 102 may be installed in various operational areas having varying light conditions. Examples of the operational areas include an office environment, house environment, outdoor environment having ample amount of bright and ambient light, and a shaded environment having little amount of light.

In one implementation, the scanning device 102 includes a transparent document holder 104 on which the document to be scanned is kept and a scanner lid 106 for covering the document during a scanning process. The scanner lid 106 is provided for preventing external light from interfering with the scanning process. In one implementation, a document pad (not shown in the figure) is attached to an inner side of the scanner lid 106 such that the document pad acts as a background for the document during the scanning. Further, the scanning device 102 includes a plurality of sensors (not shown in the figure) and illuminants (not shown in the figure) underneath the document holder 104. In one implementation, the sensors and the illuminants are positioned facing the document holder 104.

The illuminants, such as LEDs or bulbs shine light on the document during the scanning process such that the light strikes the document and is reflected onto the sensors. In one implementation, the sensors are photosensitive elements that obtain image data corresponding to different areas of the document based on the light reflected from those areas. For the purpose, the sensors are provided as arrays and arranged such that each sensor receives light reflected from a particular area of the document. Further, the number of sensors used in the scanning device 102 may depend upon the size of the document holder 104 such that the sensors are equally placed to cover the whole area beneath the document holder 104.

During the scanning process, the light reflected by the document may be received by the sensors which may generate a signal based upon the sensed light. The signal, thus generated by each of the sensor, may be used to obtain the digital copy of the document.

Further, in order to provide good quality of the digital copy of the document, the scanning device 102 may be calibrated at some predetermined time period, for example, each time the scanning device is rebooted. In an implementation, the scanning device 102 detects and discards erroneous calibrations caused due to external light and instead use results obtained from a previous calibration or a reference calibration for correcting offsets. The previous calibration may be defined as the last calibration of the scanning device 102 done before the current calibration. The reference calibration may be defined as the calibration performed at a factory site where the scanning device 102 is manufactured.

In one embodiment, the scanning device 102 includes processors 108. The processor 108 may be implemented as microprocessors, microcomputers, microcontrollers, digital signal processors, central processing units, state machines, logic circuitries, and/or any devices that manipulate signals based on operational instructions. Among other capabilities, the processor(s) 108 fetch and execute computer-readable instructions stored in the memory.

The functions of the various elements shown in the figure, including any functional blocks labeled as "processor(s)", may be provided through the use of dedicated hardware as well as hardware capable of executing machine readable instructions.

The scanning device 102 also includes interface(s) 110. The interfaces 110 may include a variety of commercially available interfaces that allow the scanning device 102 to interact with other devices, such as network entities, web servers, and external repositories. The interface(s) 110 may facilitate multiple communications within a wide variety of networks and protocol types, including wire networks, for example, LAN, cable, and IP, and wireless networks, for example, WLAN, cellular, and satellite-based network.

Further, the scanning device 102 includes memory 112, coupled to the processor(s) 108. The memory 112 may include any computer-readable medium known in the art including, for example, volatile memory (e.g., RAM), and/or non-volatile memory (e.g., EPROM, flash memory, etc.).

Further, the scanning device 102 includes modules 114 and data 116. The modules 114 may be coupled to the processor(s) 108. The modules 114, amongst other things, may include routines, programs, objects, components, and data structures, which perform particular tasks or implement particular abstract data types. The data 116 serves, amongst other things, as a repository for storing data that may be fetched, processed, received, or generated by the modules 114. Although the data 116 is shown internal to the scanning device 102, the data 116 can reside in an external repository (not shown in the figure), which may be coupled to the scanning device 102. In such a case, the scanning device 102 may communicate with the external repository through the interface(s) 110 to obtain information from the data 116.

In an implementation, the modules 114 include a scanning module 118, an image analysis module 120, a calibration module 122, and other module(s) 124. In an implementation, the data 116 includes scanning data 126, analysis data 128, calibration data 130, and other data 132. The other module(s) 124 may include programs or coded instructions that supplement applications and functions, for example, programs in the operating system of the scanning device 102, and the other data 132 may comprise data corresponding to module(s) 114.

As previously described, the scanning device 102 may perform a calibration process at a predetermined time and determine whether the calibration values currently determined are erroneous or not. For the purpose, the scanning device 102 compares the calibration values with a set of reference calibration values obtained by performing an initial calibration at a factory site.

In one implementation, the scanning module 118 may initially perform a dark scan of a calibration strip (not shown in the figure) for obtaining the reference calibration values. For the purpose, an operator at the factory may initially put the scanner lid 106 in a close position to prevent any outside light from falling on the document holder 104. The scanning module 118 subsequently puts all the illuminants in OFF mode and initiates the sensors to generate signals for their corresponding areas. The signals from all the sensors thus received may be used by the scanning module 118 to generate a dark scan image. Further, no document is kept in the document holder 104 during the dark scan and the dark scan image is thus a digital image of the calibration strip. Further, the scanning module 118 saves the dark scan image of the calibration strip in the scanning data 126.

The dark scan image is subsequently analyzed by the image analysis module 120. The image analysis module 120 initially divides the dark scan image into one or more regions for the analysis. In one implementation, the image analysis module 120 may divide the dark scan image into a predetermined number of regions based upon size of the document holder 104 such that each region is of a size large enough to provide appropriate number of data points for meaningful statistical analysis and at the same time be short enough to minimize inherent variations in signals caused due to design of the scanning device 102. For instance, the image analysis module 120 may divide the dark scan image into three regions if the document holder 104 is of average size. In some examples, only one region may be needed. The image analysis module 120 may further increase the number of regions to four, five, and so on for the document holder 104 of larger size. In another implementation, the number of regions may be predetermined, for example, by a manufacturer of the scanning device 102. In such a case, the image analysis module 120 may obtain the predetermined number from the analysis data 128 and divide the dark scan image accordingly.

The image analysis module 120 may subsequently analyze each of the regions for obtaining data points corresponding to different areas of the region. A data point corresponding to an area of the region is a value given to signal generated by the sensor corresponding to that area upon sensing light reflected from that area. In one implementation, each signal may be assigned a value by the image analysis module 120 depending upon the intensity of the light sensed by the sensors to obtain the data point.

In one implementation, a data point may be obtained corresponding to each of the sensors provided in the scanning device 102. For instance, for the scanning device 102 having 2580 sensors, the image analysis module 120 may obtain 2580 data points. Further, the image analysis module 120 may process the data points to remove any noise generated along with the data points. In one implementation, the image analysis module 120 may process the data points using a filter, such as a finite impulse response (FIR) filter.

The image analysis module 120 may subsequently use the data points to ascertain calibration values for the scanning device 102. In one implementation, the image analysis module 120 may use the data points to obtain, as the calibration value, statistical mean and standard deviation for each of the regions. Further, the image analysis module 120 may save the statistical mean and standard deviation for each of the regions as reference statistical mean and standard deviation for each of the regions in the analysis data 128 for being used as reference calibration values for future calibrations. The reference calibration values may be used for determining correctness of any calibration values obtained upon subsequent calibrations done for the scanning device 102. For instance, the reference calibration values may be used to determine whether any calibration values obtained after calibration of the scanning device 102 upon installation, say, in any office environment, are correct or not.

The scanning module 118, in such a case, may perform the calibration process again by re-performing the dark scan to obtain a current dark scan image of the calibration strip. Further, the scanning module 118 may save the current dark scan image in the scanning data 126. The current dark scan image may be subsequently used by the image analysis module 120 for obtaining current statistical mean and standard deviation value. For the purpose, the image analysis module 120 may divide the current dark scan image into the regions equal to the number of regions obtained during the initial calibration at the factory site. The image analysis module 120 may then analyze each of the regions to obtain data points for determining the current mean and standard value, i.e., current calibration values. Further, the image analysis module 120 may save the current calibration values in the analysis data 128.

The calibration module 122 may subsequently compare the current calibration values with the reference calibration values to determine whether the current calibration values are correct or not. In case the calibration module 122 determines that difference between the current calibration values and the reference calibration value increases by a threshold value, then the calibration module 122 may determine the current calibration values to be erroneous. The calibration module 122 may discard the calibration value and take a corrective action. For instance, in case the difference between the mean and the reference mean exceeds by a predetermined percentage of the reference mean, say, 10%, 15%, or 20%, or if the difference between the standard deviation and the reference standard deviation exceeds by a predetermined percentage of the reference standard deviation, say, 150%, 200%, or 250%, the current calibration values may be erroneous. The calibration module 122, based on the above comparison may ascertain the current calibration to be an erroneous calibration thus indicating interference of external light during the current calibration of the scanning device 102. Further, the calibration module 122 may save the comparison results in the calibration data 130.

Upon determining the current calibration values to be erroneous, the calibration module 122 may initiate a corrective action. In one embodiment, the calibration module 122 may discard the current calibration values and use either the reference calibration values or previous calibration values, i.e., calibration values obtained upon previous calibration that were correct and used previously by the calibration module 122 to correct offset in the scanning device 102. In another embodiment, the calibration module 122 may provide an alert message on a user interface (not shown in the figure) of the scanning device 102. For instance, in one implementation, the calibration module 122 may send an alert message to ask the user of the scanning device 102 to move the scanning device 102 to a shaded place, to avoid interference caused due to the external light. In another implementation, calibration module 122 may send the alert message indicating the presence of external light interference in a particular region and ask the user to switch off light sources from the direction proximate to the particular region. In yet another implementation, the calibration module 122 may provide the alert message to ask the user to properly close the scanner lid 106 to avoid interference from the external light and perform a re-calibration for the scanning device 102.

In case the current calibration values are correct, that is the difference between the current calibration values and the reference calibration values does not exceed the threshold difference values, the calibration module 122 may use the current calibration values for further processing. For instance, the calibration module 122 may use the current calibration value for correcting the offsets in the scanning device 102. Alternatively, the calibration module 122 may use the current calibration values for PRNU calibration for correcting offsets of the scanning device 102. Using the correct calibration values as obtained above for the PRNU calibration helps in avoiding erroneous calibrations thus facilitating a good quality scan of the document.

Figure 2:
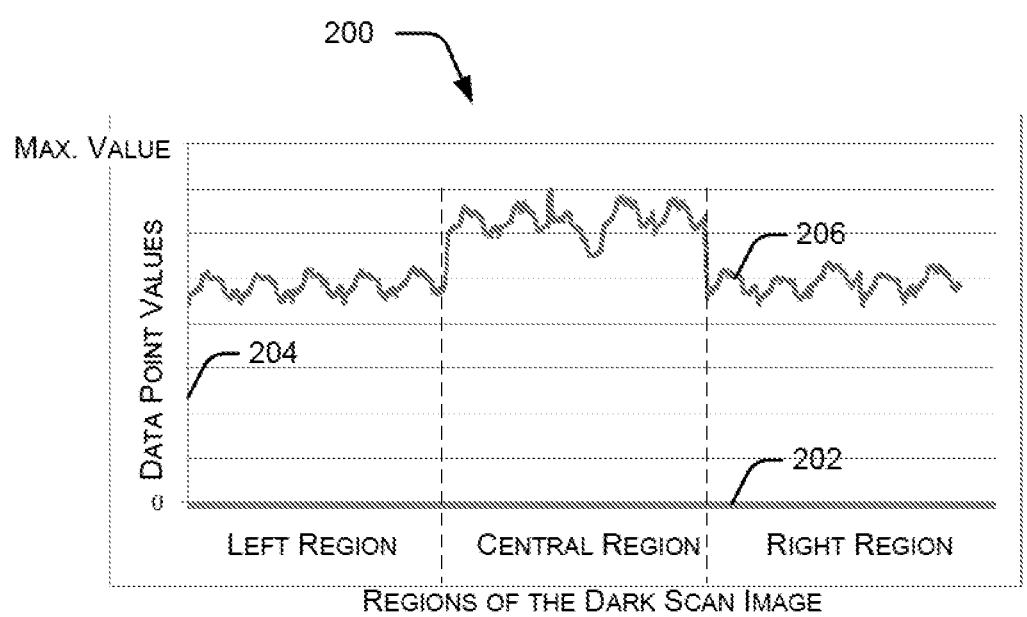
FIG. 2 illustrates a graphical plot depicting data points obtained by the scanning device upon a positive calibration, according to an embodiment of the present subject matter.

FIG. 2 illustrates a graphical plot depicting data points obtained by the scanning device 102 upon a positive calibration, i.e., when the calibration values are not erroneous, according to an embodiment of the present subject matter. The graph 200 shows the results obtained after calibration of the scanning device 102. In the graph 200, region of the dark scan image, taken using the scanning device 102, is taken as a reference position and is represented along a horizontal axis 202. For the purpose of experiment, and not as a limitation, the dark scan image has been divided into three regions, namely, a right region, a central region, and a left region. Vertical axis 204 represents the data point values assigned to signals generated in each region. Further, curve 206 represents the data point values obtained for each region by sensors of the scanning device 102.

Figure 3:
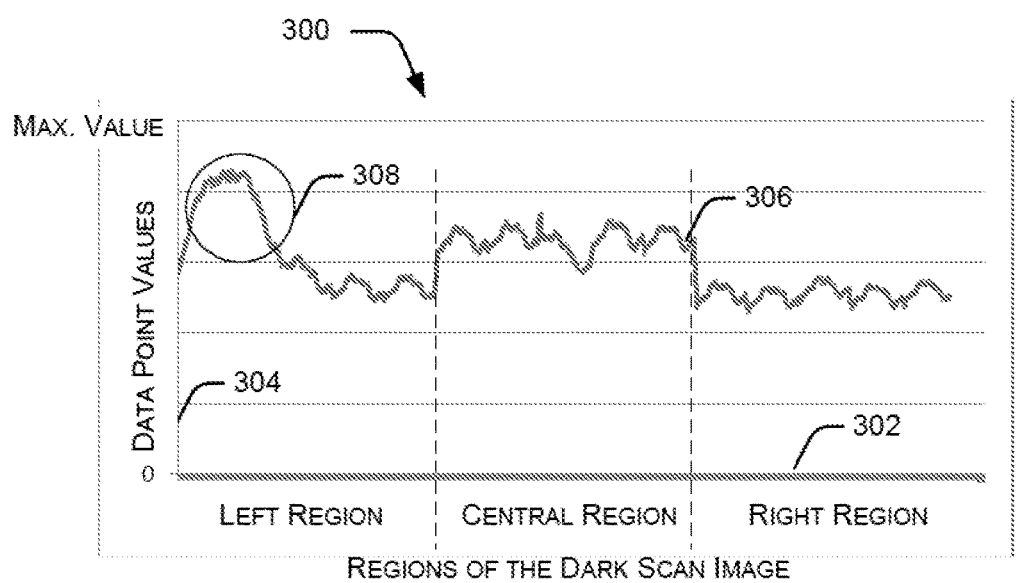
FIG. 3 illustrates a graphical plot depicting data points obtained by the scanning device upon a negative calibration, according to an embodiment of the present subject matter.

FIG. 3 illustrates a graphical plot 300 depicting data points obtained by the scanning device 102 upon a negative calibration, i.e., when the calibration values are erroneous, according to an embodiment of the present subject matter. The graph 300 shows the results obtained after calibration of the scanning device 102. In the graph 300, regions of the dark scan image taken using the scanning device 102 is taken as a reference position and is represented along a horizontal axis 302. For the purpose of experiment, and not as a limitation, the dark scan image has been divided into three regions, namely, a right region, a central region, and a left region. Vertical axis 304 represents values of the data points assigned to signals generated in each region by sensors of the scanning device 102. Further, curve 306 represents the data point values obtained in each region. As illustrated, data points corresponding to sensors numbered 1 to 310, indicated by a circle 308, have abnormally higher values as compared to other data points, thus indicating possible interference from external light.

Figure 4:
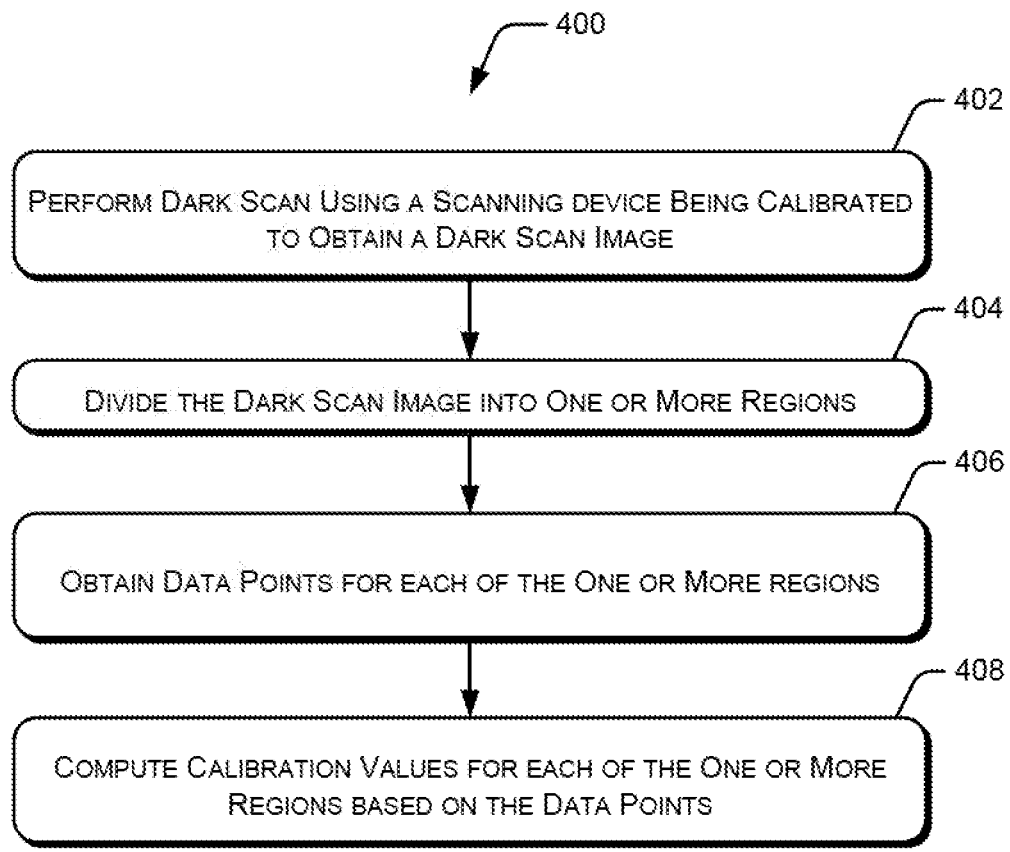
FIG. 4 illustrates a method for determining calibration values for calibrating a scanning device, in accordance with an embodiment of the present subject matter.
Figure 5:
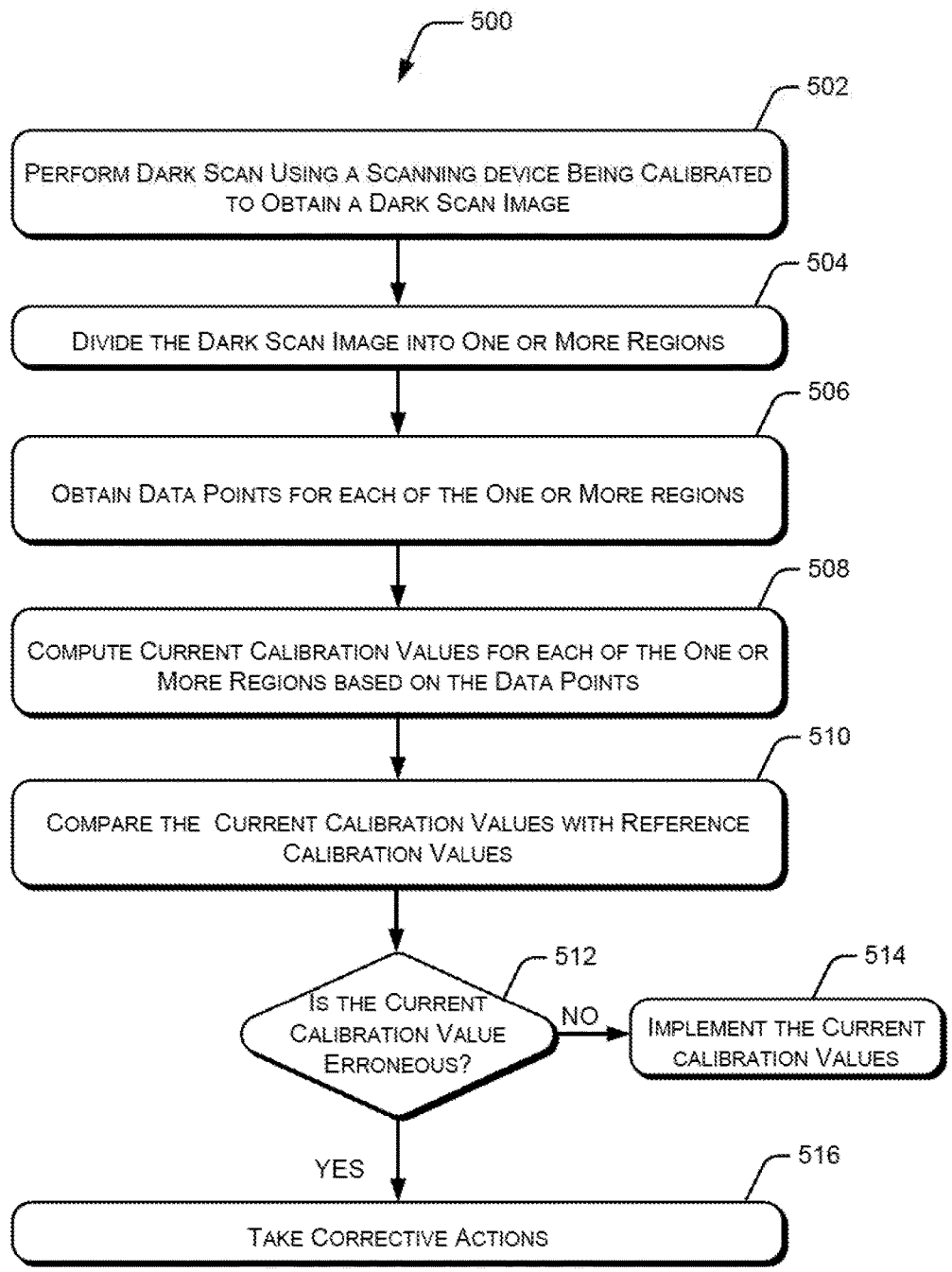
FIG. 5 illustrates a method for calibrating a scanning device, in accordance with an embodiment of the present subject matter.

FIGS. 4 and 5 illustrate a method 400 and a method 500 for calibrating a scanning device, in accordance with an embodiment of the present subject matter. The order in which the methods 400 and 500 are described is not intended to be construed as a limitation, and any number of the described method blocks can be combined in any order to implement the methods 400 and 500, or an alternative method. Additionally, individual blocks may be deleted from the methods 400 and 500 without departing from the spirit and scope of the subject matter described herein. Furthermore, the methods 400 and 500 can be implemented in any suitable hardware, machine readable instructions, or combination thereof.

The steps of the methods 400 and 500 can be performed by programmed computing devices. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication system performing said steps of the method.

Further, although the methods 400 and 500 may be implemented in a variety of communication systems working in different communication network environments, in embodiments described in FIG. 4 and FIG. 5, the methods 400 and 500 are explained in context of the aforementioned scanning device 102.

FIG. 4 illustrates the method 400 for determining calibration values for calibrating a scanning device, in accordance with an embodiment of the present subject matter. In one implementation, the method 400 may be performed to obtain current calibration values for calibrating the scanning device 102 after installing the scanning device in any user network, say, at any office network environment. In another implementation, the method 400 may be performed at a factory site to obtain reference calibration values.

At block 402, a dark scan is performed using a scanning device being calibrated. In one implementation, the dark scan is performed with illuminants of the scan device in an OFF mode to obtain a dark scan image of a calibration strip of the scanning device. For example, a scanning module, say, the scanning module 118 may perform the dark scan to obtain the dark scan image. Further, the dark scan image may be saved in the scanning data 126 of the scanning device 102.

At block 404, the dark scan image is divided into one or more regions. In one implementation, the dark scan image obtained at block 402 may be divided into one or more regions for analysis, for example, by the image analysis module 120. As described earlier, the number of regions may be either predetermined or determined based on the size of a document holder of the scanning device.

At block 406, data points are obtained for each of the one or more regions. The image analysis module 120 may analyze each of the regions to determine data points based on signals generated by each of sensors corresponding to the region. In one implementation, the signals may be given some values based on, for instance, intensity of the light sensed by the sensors to obtain the data points.

At block 408, calibration values are computed based on the data points. In an implementation, the current calibration values include statistical mean and standard deviation and are determined by the image analysis module 120 for each of the regions based on the data points corresponding to the region. Further, the current calibration values may be saved in the analysis data 128 of the scanning device 102. In one implementation, the calibration values may be the reference calibration values obtained upon performing calibration of the scanning device at a factory site. In another implementation, the calibration values may be the current calibration values obtained upon performing calibration of the scanning device 102 after being installed in a user network, say, in any office network environment.

FIG. 5 illustrates the method 500 for calibrating a scanning device, in accordance with an embodiment of the present subject matter.

At block 502, a dark scan is performed using a scanning device being calibrated. In one implementation, a scanning module, say, the scanning module 118 may perform the dark scan to obtain a dark scan image of the calibration strip. Further, the dark scan image may be saved in the scanning data 126 of the scanning device 102.

At block 504, the dark scan image is divided into one or more regions. In one implementation, the dark scan image obtained at block 502 may be divided into of the one or more regions for analysis, for example, by the image analysis module 120.

At block 506, data points are obtained for each of the one or more regions. The image analysis module 120 may analyze each of the regions to determine data points based on signals generated by each of sensors corresponding to the region.

At block 508, current calibration values are computed based on the data points. In an implementation, the current calibration values include statistical mean and standard deviation and are determined by the image analysis module 120 for each of the regions based on the data points corresponding to the region. Further, the current calibration values may be saved in the analysis data 128 of the scanning device 102.

At block 510, the current calibration values are compared with reference calibration values. In an implementation, a calibration module, for example, the calibration module 122 of the scanning device 102 may compare the current calibration values with the reference calibration values.

At block 512, a determination is made to ascertain whether the current calibration values are erroneous. For instance, if the difference between the current calibration values and the reference calibration values exceeds a threshold value, the current calibration values maybe erroneous. For example, when the difference between the current mean and the reference mean exceeds by a predetermined percentage of the reference mean or the difference between the standard deviation and the reference standard deviation exceeds a predetermined percentage of the reference standard deviation. If the calibration module 122 determines that the current calibration values are not erroneous, which is the 'No' path from the block 512, the current calibration values are implemented at block 514. In one implementation, the scanning device 102 may use the current calibration values for correcting offsets. In another implementation, the scanning device 102 may use the current calibration values for further PRNU calibration.

At block 516, corrective actions are taken. In one embodiment, the current calibration values may be discarded and instead correct calibration values obtained during a previous calibration may be used. In another embodiment, an alert message may be provided to a user of the scanning device 102. For instance, an alert message asking the user to close scanner lid 106 of the scanning device 102 and re-calibrating the scanning device 102 may be provided on a user interface of the scanning device 102. Further, an alert message may be provided to ask the user to move the scanning device 102 to a shady place, i.e., a place having less or no external light.

Alternatively, an alert message may be provided to ask the user to switch off light sources present in a particular direction from where the external light may be interfering with the calibration process.

Although embodiments for calibration of scanning device have been described in language specific to structural features and/or methods, the present subject matter is not necessarily limited to the specific features or methods described. Rather, the specific features and methods are disclosed and explained in the context of a few embodiments for calibration of scanning device.

We claim:

1. A method for calibrating a scanning device having an illuminant to illuminate an image to be scanned, the method comprising:
    analyzing a dark scan image of a calibration strip to obtain at least one data point from each of one or more regions of the dark scan image, wherein the dark scan image is an image that is obtained with the illuminant turned off;
    computing calibration values for each of the one or more regions based on the at least one data point for calibrating the scanning device, wherein the calibration values include mean and standard deviation of the data points for each of the one or more regions;
    comparing the calibration values with reference calibration values corresponding to each of the one or more regions, wherein the calibration values are current calibration values; and
    determining if the current calibration values are erroneous based on the comparing.

2. The method as claimed in claim 1, further comprising:
    performing a dark scan to obtain the dark scan image with the illuminant turned off; and
    dividing the dark scan image into the one or more regions.

3. The method as claimed in claim 1, further comprising taking a corrective action for the current calibration values being erroneous, wherein the corrective action comprises using at least one of previous calibration values and the reference calibration values for calibration.

4. The method as claimed in claim 1, further comprising taking a corrective action for the current calibration values being erroneous, wherein the corrective action comprises providing an alert message asking a user of the scanning device to do at least one of moving the scanning device to a shady place, switching OFF selected light sources, and re-perform the calibration of the scanning device after properly closing a scanner lid of the scanning device.

5. The method as claimed in claim 1, further comprising, for the current calibration values not to be erroneous, using the current calibration values for photo response non-uniformity (PRNU) calibration.

6. The method as claimed in claim 1, wherein the reference calibration values are obtained at a factory site of the scanning device.

7. A scanning device having an illuminant to illuminate an image to be scanned, said scanning device comprising:
    a processor;
    an image analysis module coupled to the processor to:
        divide a dark scan image of a calibration strip into one or more regions, wherein the dark scan image is an image that is obtained with the illuminant turned off;
        obtain at least one data point from each of the one or more regions;
        compute current calibration values for each of the one or more regions based on the at least one data point, wherein the calibration values for each of the one or more regions include mean and standard deviation of the data points of the region; and
    a calibration module coupled to the processor to:
        compare the current calibration values with reference calibration values corresponding to each of the one or more regions; and
        determine if the current calibration values are erroneous based on the comparing.

8. The scanning device as claimed in claim 7, wherein the calibration module is further to take a corrective action for the current calibration values being erroneous, and wherein the corrective action includes at least one of providing an alert message and using at least one of previous calibration values and the reference calibration values for calibration.

9. The scanning device as claimed in claim 8, wherein the calibration module is further to provide the alert message asking a user of the scanning device to do at least one of moving the scanning device to a shady place, switching OFF light sources in a particular direction, and re-perform calibration of the scanning device after properly closing a scanner lid of the scanning device.

10. The scanning device as claimed in claim 7, wherein the calibration module is further to use the current calibration values for photo response non-uniformity (PRNU) calibration upon determining the current calibration values not to be erroneous.

11. The scanning device as claimed in claim 7, wherein the image analysis module is further to process the data points using a finite impulse response filter.

12. The scanning device as claimed in claim 7, further comprising a scanning module coupled to the processor to perform a dark scan to obtain the dark scan image of the calibration strip, wherein the dark scan involves scanning the calibration strip with the illuminant turned off.

13. The scanning device comprising as claimed in claim 7, wherein the calibration module is further to determine the current calibration values to be erroneous for a difference between the current calibration values and the reference calibration values exceeding a threshold value.

14. A non-transitory computer-readable medium having a set of computer readable instructions that, when executed, cause a scanning device to:
    perform a dark scan of a calibration strip to obtain a dark scan image of the calibration strip, wherein the scanning device includes an illuminant to illuminate an image to be scanned, and wherein the dark scan is performed with the illuminant turned off;
    divide the dark scan image into one or more regions;
    analyze the dark scan image to obtain at least one data point from each of the one or more regions;
    compute current calibration values for each of the one or more regions based on the at least one data point, wherein the calibration values for each of the one or more regions include mean and standard deviation of the data points of the region;
    compare the current calibration values with reference calibration values corresponding to each of the one or more regions;
    determine if the current calibration values are erroneous based on the comparing; and
    take a corrective action for the current calibration values being erroneous.

15. The non-transitory computer-readable medium as claimed in claim 14, wherein the set of computer readable instructions that, when executed, further cause a scanning device to perform at least one of providing an alert message and using at least one of previous calibration values and the reference calibration values for calibration.

* * * * *